US006169736B1

(12) United States Patent
Van Hoogenbemt

(10) Patent No.: US 6,169,736 B1
(45) Date of Patent: Jan. 2, 2001

(54) INTERFACING DEVICE TO EXTRACT M SETS OF BITS OUT OF N SETS OF BITS, CONTROL UNIT AND LOGICAL CELL

(75) Inventor: Stefaan Margriet Albert Van Hoogenbemt, Mechelen (BE)

(73) Assignee: Alcatel, Paris (FR)

( * ) Notice: Under 35 U.S.C. 154(b), the term of this patent shall be extended for 0 days.

(21) Appl. No.: 09/028,264

(22) Filed: Feb. 23, 1998

(30) Foreign Application Priority Data

Feb. 28, 1997 (EP) .................................................. 97400464

(51) Int. Cl.[7] .................................................. H04L 12/28
(52) U.S. Cl. ........................ 370/360; 370/393; 370/395; 370/401
(58) Field of Search ..................................... 370/360, 363, 370/393, 395, 397, 401, 412, 413, 390, 471, 476, 505, 509; 375/240, 292

(56) References Cited

U.S. PATENT DOCUMENTS

| 4,085,447 | 4/1978 | Pertl et al. ............................ 364/900 |
| 4,250,439 | 2/1981 | Liepa .................................... 364/200 |
| 4,309,754 | 1/1982 | Dinwiddie, Jr. ...................... 364/200 |
| 5,272,703 | * 12/1993 | Peters .................................... 370/505 |
| 5,459,743 | * 10/1995 | Fukuda et al. ....................... 371/67.1 |
| 5,471,632 | * 11/1995 | Gavin et al. .......................... 395/284 |
| 5,481,687 | 1/1996 | Goubert et al. .................. 395/421.02 |
| 5,638,367 | 6/1997 | Gaytan et al. ........................ 370/471 |
| 5,757,796 | * 5/1998 | Hebb .................................... 370/393 |
| 5,982,772 | * 11/1999 | Oskouy ................................ 370/395 |

FOREIGN PATENT DOCUMENTS

| 0552384 | 7/1993 | (EP) . |
| 0600683 | 6/1994 | (EP) . |
| 0752800 | 7/1996 | (EP) . |

OTHER PUBLICATIONS

"Packet Switching and Frame Relay in a Broadband Network", L. Jenkins, *Alcatel Telecommunications Review*, 2nd Quarter 1996, pp. 138–143.

* cited by examiner

*Primary Examiner*—Huy D. Vu
*Assistant Examiner*—M. Phan

(57) ABSTRACT

An interfacing device (INT) which extracts M outgoing sets of bits (OS1, OS2, . . . , OSM) out of N incoming sets of bits (IS1, IS2, . . . , ISN), M being smaller than N, includes:
  a. an incoming register (IR) wherein the N incoming sets of bits (IS1, IS2, . . . , ISN) are temporarily stored; and
  b. a selector (SEL) comprising a multiplexer bank (MUX) with M multiplexers (MUX1, MUX2, . . . , MUXM) each having N–M+1 inputs and one output, and a control unit (CTRL) for the multiplexer bank (MUX). The distinct sets of N–M+1 incoming sets of bits that are applied to distinct multiplexers overlap and the control unit (CTRL) can control the multiplexers (MUX1, MUX2, . . . , MUXM) so that an appropriate order is respected by the outgoing sets of bits (OS1, OS2, . . . , OSM).

6 Claims, 3 Drawing Sheets

| CS | DISI,ENJ | | | |
|---|---|---|---|---|
| | 0 0 | 0 1 | 1 1 | 1 0 |
| CB 0 | 0 | 0 | 0 | 0 |
| 1 | 0 | 1 | 0 | 0 |

Fig. 3

| ENJ+1 | DISI,ENJ | | | |
|---|---|---|---|---|
| | 0 0 | 0 1 | 1 1 | 1 0 |
| CB 0 | 0 | 1 | 1 | 0 |
| 1 | 0 | 0 | 1 | 0 |

Fig. 4

INTERFACING DEVICE TO EXTRACT M SETS OF BITS OUT OF N SETS OF BITS, CONTROL UNIT AND LOGICAL CELL

BACKGROUND OF THE INVENTION

1. Technical Field

The present invention relates to an interfacing device for interfacing bit-parrallel data buses or different bit width and a control unit of the interfacing device, and a logical cell for use in such a control unit.

2. Discussion of Related Art

Such an interfacing device is already known in the art, e.g. from the U.S. Pat. No. 4,309,754, entitled 'Data interface mechanism for interfacing bit-parallel data buses of different bit width'.

Therein (cf. Col. 1, In. 39–45), an interface mechanism is described which includes an incoming register means, named a data register, and a selection means, called a selector circuitry which connects portions of the data register to an outgoing data bus which is narrower than the data bus entering the data register. The selector circuitry in other words extracts outgoing sets of bits out of incoming sets of bits, the number of outgoing sets of bits being smaller than the number of incoming sets of bits.

Such an interfacing device is useful in particular when several data handling units are connected to the outgoing side of the interfacing device, and different ones of these data handling units need to be provided with only a portion of the data entering simultaneously the incoming side of the device. This is for instance so when the incoming sets of data bits are ATM (Asynchronous Transfer Mode) cell headers containing routing information only a portion of which is used to address a RAM (random access memory).

The selector circuitry described in U.S. Pat. No. 4,309,754 is drawn in FIG. 1 of the U.S. Patent and consists of a microprocessor, control program storage means, a direct memory access controller, an interrupt controller, a dual port storage memory means, and some other means. The selector circuitry hence is very complex in hardware.

SUMMARY OF THE INVENTION

It is an object of the present invention to realize an interfacing device of the above known type, but wherein the hardware complexity of the selection means is reduced significantly.

According to a first aspect of the invention, an interfacing device (INT) to be coupled between an incoming channel (IC) and an outgoing channel (OC) and to be used to extract M outgoing sets of bits (OS1, OS2, . . . , OSM) out of N incoming sets of bits (IS1, IS2, . . . , ISN) received on said incoming channel (IC), M being an integer number smaller than N, said interfacing device (INT) comprising:

a. incoming register means (IR) provided to temporarily store said N incoming sets of bits (IS1, IS2, . . . , ISN); and b. selection means (SEL) coupled between said incoming register means (IR) and said outgoing channel (OC), and provided to select M incoming sets of bits out of said N incoming sets of bits (IS1, IS2, . . . , ISN) and to route said M incoming sets of bits to said outgoing channel (OC) to thereby produce said M outgoing sets of bits (OS1, OS2, . . . , OSM), is characterized in that said selection means (SEL) further comprises:

c. a multiplexing unit (MUX) including M multiplexers (MUX1, MUX2, . . . , MUXM), each multiplexer having a control input, N−M+1 input terminals adapted to sink N−M+1 incoming sets of bits out of said N incoming sets of bits (IS1, IS2, . . . , ISN), and one output terminal adapted to source one of said N−M+1 incoming sets of bits under control of a control signal applied to said control input; and d. a control unit (CTRL) adapted to generate for said each multiplexer, said control signal and to apply said control signal via an output terminal of said control unit (CTRL) to said control input of said each multiplexer.

Indeed, when realizing the selector means only by a bank of identical multiplexers and a control unit, the hardware complexity is reduced significantly. Since the chip surface required to implement a multiplexer grows exponentially with the number of inputs and number of outputs thereof, a selector with a bank of identical multiplexers, each having N−M+1 inputs furthermore is less complex in hardware than a selector consisting of only one multiplexer having N inputs and M outputs. As will be seen later, the control unit for generating the control signals for the bank of multiplexers, can be realized with low hardware requirements.

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

In further accord with the first aspect of the invention, the interfacing device is characterized in that a multiplexer with index i amongst said M multiplexers (MUX1, MUX2, . . . , MUXM), said N−M+1 input terminals are adapted to respectively sink incoming sets of bits with indices i to i+N−M amongst said N incoming sets of bits (IS1, IS2, . . . , ISN), and said output terminal of said multiplexer with index i is adapted to source an outgoing set of bits with index i amongst said M outgoing sets of bits (OS1, OS2, . . . OSM).

In this way, the sequence of outgoing sets of bits may respect the sequence of incoming sets of bits. This may be useful, as is indicated in Col. 1, In. 44 of U.S. Pat. No. 4,309,754. By applying sets 1 to N−M+1 to multiplexer 1, sets 2 to N−M+2 to multiplexer 2, . . . , sets M to N to multiplexer M, the outgoing sets of bits may be selected so that any couple of subsequent incoming sets of bits do not change order when passing through the interfacing device and thus become subsequent outgoing sets of bits if they are both extracted by the interfacing device.

In still further accord with the first aspect of the present invention, the interfacing device is characterized in that said control unit (CTRL) comprises: a matrix of identical logical cells ($C_{1,1}$; . . . ; $C_{M,N-M+1}$), each logical cell being associated with one multiplexer of said M multiplexers (MUX1, MUX2, . . . , MUXM) and with one input terminal of said N−M+1 input terminals of said one multiplexer, and being adapted to generate a control signal indicating whether said output terminal of said one multiplexer has to source an incoming set of bits sunk by said one input terminal or not.

Indeed, by constructing the control unit as a matrix of identical logical cells, the hardware complexity is even more reduced since the control unit is then realized by repeating a simple logical cell structure.

A particular embodiment of the interfacing device according to the first aspect of the present invention wherein the control unit is constructed of a matrix of logical cells is defined in that each logical cell is equipped with three input terminals (CB, ENJ+1) whereof:

a first input terminal (CB) is adapted to sink a signal indicating whether said incoming set of bits forms part of said M incoming sets of bits to be selected by said selection means (SEL);

a second input terminal (ENJ) is adapted to sink a signal indicating that said output terminal of said one multiplexer has to source an incoming set of bits sunk by another input terminal than said one input terminal;

a third input terminal (DISI) is adapted to sink a signal indicating that an outgoing terminal of another multiplexer than said one multiplexer has to source said incoming set of bits sunk by said one input terminal;

a first output terminal (CS) is adapted to source said control signal; and a second output terminal (ENJ+1) is adapted to source a signal indicating that said output terminal does not source said incoming set of bits sunk by said one input terminal.

In accord with a second aspect of the invention, a logical cell ($C_{i,j}$) to be used in a control unit (CTRL) of an interfacing device (INT) which extracts M outgoing sets of bits (OS1, OS2, ..., OSM) out of N incoming sets of bits (IS1, IS2, ..., ISN), M being an integer number smaller than N, said logical cell ($C_{i,j}$) being adapted to generate a control signal for an associated multiplexer in said interfacing device (INT) with N−M+1 input terminals adapted to sink N−M+1 incoming sets of bits, said logical cell ($C_{i,j}$) being associated with one input terminal of said N−M+1 input terminals and said control signal indicating whether an output terminal of said associated multiplexer has to source an incoming set of bits sunk by said one input terminal or not, said logical cell ($C_{i,j}$) being equipped with three input terminals (CB, ENJ, DISI) and two output terminals (CS, ENJ+1) whereof:

a first input terminal (CB) is adapted to sink a signal indicating whether an incoming set of bits has to be extracted by said interfacing device (INT);

a second input terminal (ENJ) is adapted to sink a signal indicating that said output terminal of said associated multiplexer has to source an incoming set of bits sunk by another input terminal than said one input terminal;

a third input terminal (DISI) is adapted to sink a signal indicating that an outgoing terminal of another multiplexer in said interfacing device (INT) than said associated multiplexer has to source said incoming set of bits sunk by said one input terminal;

a first output terminal (CS) is adapted to source said control signal; and a second output terminal (ENJ+1) is adapted to source a signal indicating that said output terminal does not source said incoming set of bits sunk by said one input terminal.

In accord with a third aspect of the invention, a control unit (CTRL) used to generate a control signal for each multiplexer of M multiplexers (MUX1, MUX2, ..., MUXM) in an interfacing device (INT) which extracts M outgoing sets of bits (OS1, OS2, ..., OSM) out of N incoming sets of bits (IS1, IS2, ..., ISN), M being an integer number smaller than N, said each multiplexer having N−M+1 input terminals adapted to sink N−M+1 incoming sets of bits, said control unit (CTRL) comprising a matrix of logical cells ($C_{1,1}$; ... ; $C_{M,N-M+1}$), each logical cell ($C_{i,j}$), each logical cell ($C_{i,j}$) being associated with one multiplexer of said M multiplexers (MUX1, MUX2, ..., MUXM) and with one input terminal of said N−M+1 input terminals of said one multiplexer, and adapted to generate a control signal indicting whether an output terminal of said one multiplexer has to source an incoming set of bits sunk by said one input terminal or not, said each logical cell ($C_{i,j}$) being equipped with three input terminals (CB, ENJ, DISI) and two output terminals (CS, ENJ+1) whereof:

a first input terminal (CB) is adapted to sink a signal indicating whether said incoming set of bits has to be extracted by said interfacing device (INT);

a second input terminal (ENJ) is adapted to sink a signal indicating that said output terminal of said one multiplexer has to source an incoming set of bits sunk by another input terminal than said one input terminal;

a third input terminal (DISI) is adapted to sink a signal indicating that an outgoing terminal of another multiplexer in said interfacing device (INT) than said one multiplexer has to source said incoming set of bits sunk by said one input terminal;

a first output terminal (CS) is adapted to source said control signal; and a second output terminal (ENJ+1) is adapted to source a signal indicating that said output terminal does not source said incoming set of bits sunk by said one input terminal.

BRIEF DESCRIPTION OF THE DRAWING

The above mentioned and other objects and features of the invention will become more apparent and the invention itself will be best understood by referring to the following description of an embodiment taken in conjunction with the accompanying drawings wherein:

FIG. 3 is a digital state diagram, illustrating the value of a first outgoing signal CS of the logical cell $C_{i,j}$ drawn in FIG. 2, in function of the input signals CB, DISI and ENJ; and FIG. 4 is a digital state diagram, illustrating the value of a second outgoing signal ENJ+1 of the logical cell $C_{i,j}$ drawn in FIG. 2, in function of the input signals CB, DISI and ENJ.

DETAILED DESCRIPTION OF PREFERRED EMBODIMENTS

Figure 1:
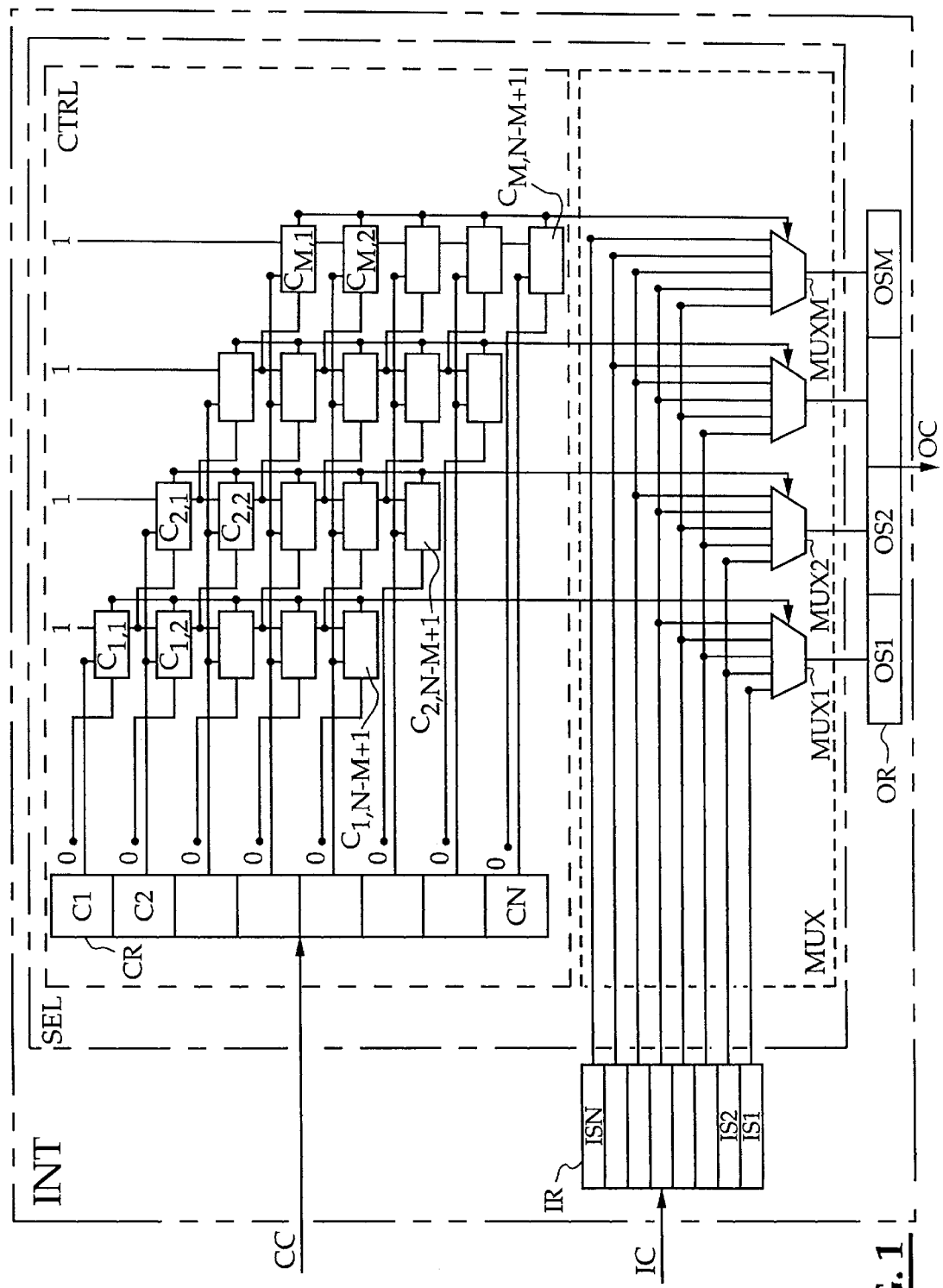
FIG. 1 represents a block scheme of an embodiment of the interfacing device INT according to the present invention.

The interface device INT of FIG. 1 performs a processing step called ATM (Asynchronous Transfer Mode) cell header reduction. For some applications, the 32 bit long ATM cell header (ATM header without the redundant error correction information) is reduced to a shorter sequence of bits. To address a RAM (random access memory) for instance, it is recommended to use short addresses since short addresses allow quick access to memory cells of the RAM. The following paragraphs are dedicated to a detailed description of the working of the interface device INT which transforms the 32 bit long ATM cell headers applied to its input into a 16 bit long sequence wherein the order of the bits is not changed from the order of the bits in the original incoming 32 bit long ATM cell header. On the other hand, an ATM Header Expansion Matrix is shown in co-owned, copending U.S. patent application Ser. No. 09/027,667 filed on even date herewith entitled "Interfacing Device to Replace M Sets of Bits Out of N Sets of Bits, Control Unit and Logical Cell" and claiming priority from European Application 97400470 filed Feb. 28, 1997 and which U.S. patent application is hereby incorporated by reference for background.

The interface device INT of the present invention is coupled between an incoming channel IC and an outgoing channel OC. These channels, IC and OC, may be parallel or serial busses. The interface device INT is equipped with an incoming register IR, a selection SEL and an outgoing register OR. In the incoming register IR, N memory cells, IS1, IS2, . . . , ISN, each having the capacity to store 4 bits, are associated with N output terminals respectively. The N output terminals constitute a parallel output port for the incoming register IR. The selector SEL on the other hand is provided with a control register CR and a matrix of logical cells $C_{1,1}, C_{1,2}, \ldots, C_{1,N-M+1}, C_{2,1}, C_{2,2}, \ldots, C_{2,N-M+1}, \ldots, C_{M,1}, C_{M,2}, \ldots, C_{M,N-M+1}$, which constitute a control unit CTRL for a multiplexer bank MUX also included in the selector SEL. The multiplexer bank MUX contains M multiplexers, MUX1, MUX2, . . . , MUXM, with N−M+1 input terminals and one output terminal each. The multiplexer bank furthermore is equipped with a parallel, N-wide, input port and parallel, M-wide output port. The last component of the interface device INT, the outgoing register OR, has M memory cells OS1, OS2, . . . , OSM, which, similarly to the memory cells of the incoming register IR, have a capacity to store 4 bits. Each memory cell of the outgoing register OR is associated with an input terminal of the outgoing register OR, and these input terminals constitute a parallel input port for the outgoing register OR.

Inside the interfacing device INT, the incoming channel IC is connected to an input terminal of the incoming register IR and the outgoing channel OC is connected to an output terminal of the outgoing register OR. The parallel output port of the incoming register IR is coupled to the parallel input port of the multiplexer bank MUX, and the parallel output port of this multiplexer bank MUX is coupled to the parallel input port of the outgoing register OR. Outputs of the logical cells in one and the same column of the matrix constitute one output terminal of the control unit CTRL, and each output terminal of the control unit CTRL is linked to a corresponding control input of a corresponding multiplexer in the multiplexer bank MUX. In the control unit CTRL, a control channel CC is coupled to an input of the control register CR which includes N memory locations C1, C2, . . . , CN each having the capacity to store 1 bit and each having associated an output terminal of the control register CR. The control channel CC is an external channel, i.e. a serial or parallel bus which enters the interface device INT. Each logical cell in the matrix is equipped with three inputs and two outputs. A first input of a logical cell $C_{i,j}$ in column i and row j of the matrix is connected to the output terminal of the control register CR associated with memory location Ci+j−1. A second input terminal of the logical cell $C_{i,j}$ is interconnected with a second output terminal of the preceding logical cell $C_{i,-j1}$ in the same column, except for the first logical cell $C_{i,j}$ in each column whose second input terminal is always kept high. A third input terminal to the logical cell $C_{i,j}$ is interconnected with the second output terminal of the preceding logical cell $C_{i-1,j}$ in the some row, except for the first logical cell $C_{i,j}$ in each row whose third input terminal is always kept low. The first output terminals of all logical cells in a single column are interconnected and constitute, as already described above, a single output terminal for the control unit CTRL. The second output terminals of the logical cells in the matrix are coupled to second and third input terminals of logical cells in subsequent columns and rows respectively in a way already described in this paragraph.

It is to be remarked that for the sake of clarity of the figure, logical cells which belong to the some row of the matrix and hence have the some index j, are not drawn on the same horizontal line in FIG. 1. This is done so to prevent from overloading the figure with connection lines.

In the multiplexer bank MUX, terminals 1 to N−M+1 of the parallel input port are connected to the N−M+1 input terminals of MUX1 respectively, terminals 2 to N−M+2 of the parallel input port are connected to the N−M+1 input terminals of MUX2 respectively and so on. In this way, there is always an overlap between the set of terminals of the parallel input port that is coupled to a multiplexer, e.g. MUX1 and the set of terminals of the parallel input port that is coupled to the next multiplexer, e.g. MUX2. It is further noticed that in FIG. 1, N equals 8 and M equals 4 so that the interface device INT is capable of selecting 4×4 bits out of 8×4 bits or, in other words, is able to reduce the ATM cell header length from 32 to 16 bits. In the following paragraphs describing the working of the interface device INT, a set of 4 consecutive bits in the ATM cell header will be called a 'nibble'. The interface device INT hence selects 4 out of 8 nibbles.

Via the incoming channel IC, an ATM cell header comprising 8 nibbles is applied to the incoming register IR to be stored in the 8 memory cells IS1, IS2, . . . , ISN. The incoming nibbles fill the memory cells IS1, IS2 , . . . , ISN in the order wherein they arrive at the incoming register IR. Simultaneously, a sequence of 8 control bits enters the control register CR via the control channel CC and the 8 control bits are stored in memory locations C1, C2, . . . , CN respectively. The 8 control bits indicate which nibbles of the 8 incoming nibbles have to be routed by the interface device INT from the incoming channel IC to the outgoing channel OC. If for instance control bit C2 is high, incoming nibble IS2 has to be routed to the outgoing channel OC. The nibbles that have to be routed to the outgoing channel OC pass via one of the multiplexers MUX1, MUX2, . . . , MUXM, to the outgoing register OR to be temporarily stored in one of the 4 memory cells OS1, OS2, . . . , OSM) before being applied to the outgoing channel OC. Obviously, this implies that 4 control bits of the 8 incoming control bits, C1, C2 , . . . , CN, have a high value and 4 of them have a low value. The outgoing nibbles are applied to the outgoing channel OC in the order of the memory cells OS1, OS2, . . . , OSM wherein they are stored. Since the interfacing device INT outputs nibbles in the order wherein they arrive, a nibble stored in a lower memory cell of the incoming register IR also has to be stored in a lower memory cell of the outgoing register OR. This is realized by the multiplexer bank MUX under control of the control signals generated by the logical cells in the matrix of the control unit CTRL, as will be explained here after.

Via the parallel bus between the incoming register IR and multiplexer bank MUX, the nibbles IS1 to IS5 are applied to the 5 input terminals of MUX1 respectively, the nibbles IS2 to IS6 are applied to the 5 input terminals of MUX2 respectively, the nibbles IS3 to IS7 are applied to the 5 input terminals of MUX3 respectively, and the nibbles IS4 to IS8 are applied to the 5 input terminals of MUX4 (MUXM in FIG. 1) respectively. In this way, any combination of 4 nibbles out of the 8 incoming nibbles can be transferred from the incoming register IR to the outgoing register OR without change in order. Suppose for instance that in the control register CR the control bits C1, C2, C6 and C8 are high while control bits C3, C4, C5 and C7 are low. Then, MUX1 has to route nibble IS1 from its first input terminal to its output terminal, MUX2 has to route nibble IS2 from its first input terminal to its output terminal, MUX3 has to route nibble IS6 from its fourth input terminal to its output terminal, and MUX4 has to route nibble IS8 from its fifth input terminal to its output terminal. The memory cells OS1, OS2, OS3 and OS4 of the outgoing register OR in this way become filled with nibbles IS1, IS2, IS6 and IS8 respectively. Consequently the right nibbles are applied in the right order to the outgoing channel OC.

The logical cells $C_{1,1}, \ldots, C_{M,N-M+1}$ in the control unit CTRL generate the control signals for MUX1, MUX2, MUX3 and MUX4 to enable these multiplexers to respectively select their first, first, fourth and fifth input terminal to be connected to their respective output terminals. Each logical cell $C_{i,j}$ thereto generates a signal indicating for multiplexer i whether it has to select its j'th input terminal or not. In other words, each logical cell $C_{i,j}$ is associated with a multiplexer MUXi and an input terminal j of this multiplexer MUXi. Logical cell $C_{i,j}$ hence generates a signal for multiplexer MUXi indicating that input terminal j has to be selected when the control bit corresponding to the nibble that is applied to input j of MUXi is high, when MUXi does not yet hove to select a nibble applied to one of its input terminals with a lower index than j, and when the nibble applied to input j of MUXi is not yet selected by a multiplexers with an index below i. The nibble applied to input i of multiplexer is $IS_{i+j-1}$. The control bit Ci+j−1 corresponding thereto is applied to the first input terminal of $C_{i,j}$. If the multiplexer MUXi already has to select a nibble applied to one of its input terminals with a lower index than j, this is told to $C_{i,j}$ via its second input terminal which receives information from cell $C_{i,j-1}$. If this information is a high bit, MUXi does not have to select a nibble applied to one of the other terminals. Similarly, if the nibble $IS_{i+j-1}$ is already selected by a multiplexer with an index below 1, this is told to $C_{i,j}$ via its third input terminal which receives information from cell $C_{i-1,j}$. If this information is a low bit, nibble $IS_{i+j-1}$ is not yet selected. Apparently, logical cell $C_{i,j}$ also has to generate similar information at its second output terminal that has to be used by logical cells $C_{i+1,j}$ and $C_{i,j+1}$. A logical cell $C_{i,j}$ able to generate the above described output signals from the three input signals is drawn in FIG. 2. The value of the outputted signals as a function of the value of the three ingoing signals is illustrated by the diagrams of FIG. 3 and FIG. 4 respectively.

Figure 2:
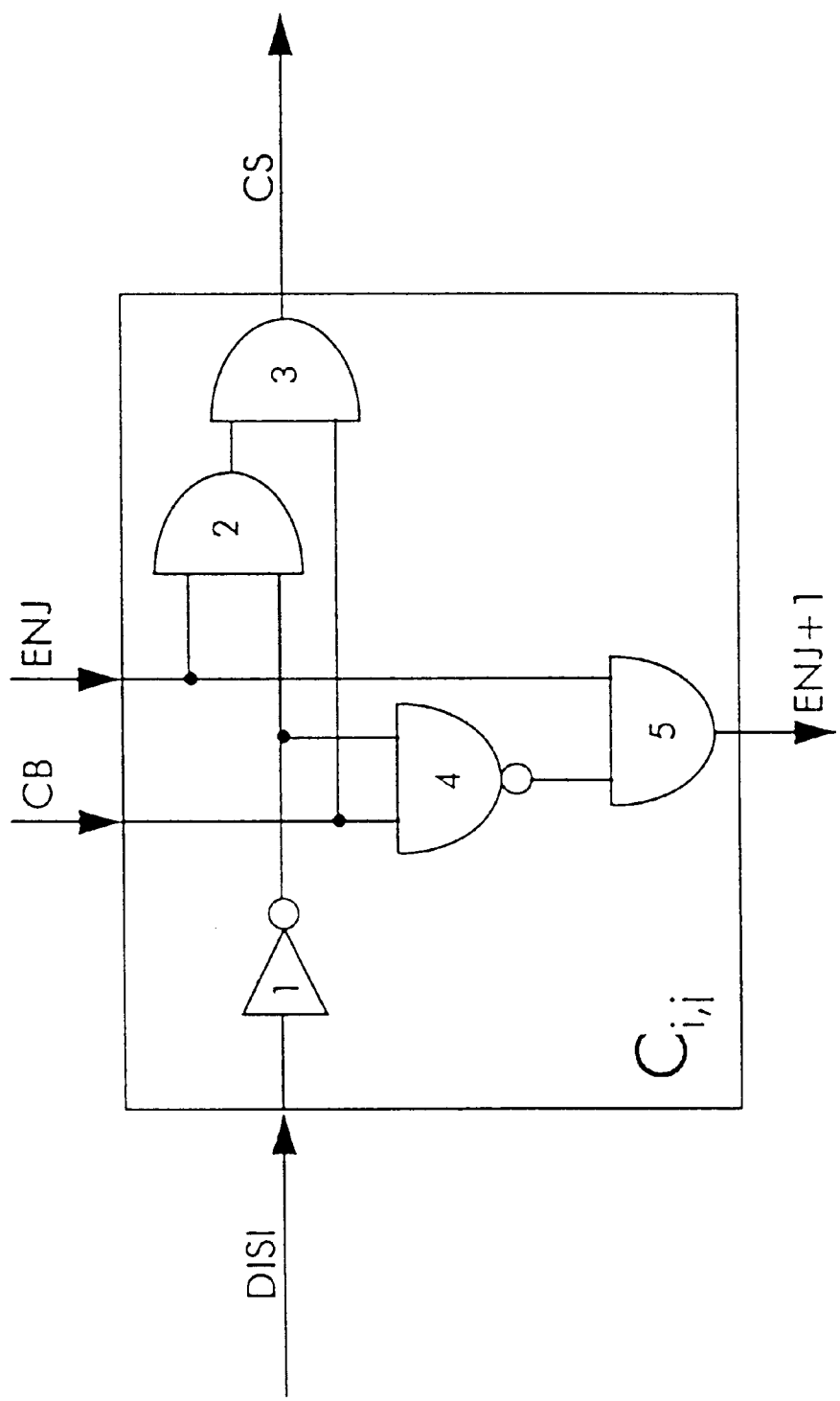
FIG. 2 represents a scheme of an embodiment of the logical cell $C_{i,j}$ according to the present invention.

FIG. 2 shows a logical cell $C_{i,j}$ which includes a NOT port 1, a first AND port 2, a second AND port 3, a NAND port 4 and a third AND port 5. The logical cell $C_{i,j}$ further has a first input CB, a second input ENJ, a third input DISI, a first output CS and a second output ENJ+1.

The first input CB is connected to a first input of the NAND port 4 and a first input of the second AND port 3. The second input ENJ is connected to a second input of the first AND port 2 and a second input of the third AND port 5. The third input DISI is connected to an input of the NOT port 1 and an output of this NOT port 1 is connected to a first input of the first AND port 2. This first AND port 2 has an output interconnected with a second input of the second AND port 3 and an output of this second AND port 3 is connected to the first output CS of the logical cell $C_{i,j}$. The output of the NOT port 1 is also connected to a second input of the NAND port 4 whose output is interconnected with a first input of the third AND port 5. This third AND port has an output terminal connected to the second output ENJ+1 of the logical cell $C_{i,j}$.

As already explained above, the signal generated at the first output CS indicates that the corresponding multiplexer MUXi has to select its j'th input terminal when both the signals at the first and second input terminals, CB and ENJ, are high and when the signal at the third input terminal DISI of the logical cell $C_{i,j}$ is low. This is also seen from FIG. 3 and hence the first output signal can be expressed as follows:

$$CS = CB \cdot ENJ \cdot \overline{DISI}$$

A person skilled in the art of designing digital logic will recognise that this first output signal is generated at the output terminal CS in FIG. 2.

In addition, it was explained above that the logical cell $C_{i,j}$ has to produce a second output signal at the second output terminal ENJ+1 which indicates that multiplexer MUXi has to select either its j'th input (this is so when CS is high) or one of the input terminals with index below j has to be selected (this is so when ENJ is low). In all these circumstances, ENJ+1 has to be low. FIG. 4 shows the state diagram wherein this is realized. From this state diagram, one can deduce that:

$$ENJ + 1 = ENJ \cdot \overline{CB} + ENJ \cdot DISI$$
$$= ENJ \cdot (\overline{CB} + DISI)$$
$$= ENJ \cdot \overline{(CB \cdot \overline{DISI})}$$

Again a person skilled in the art of designing digital logic will recognise that this second output signal is generated at the output terminal ENJ+1 in FIG. 2.

It is noticed that the working of the interfacing device INT according to the present invention is explained only by describing the operations of the functional blocks IR, SEL, CTRL, MUX, CR, MUX1 to MUXM and OR of FIG. 1 and the operations of the logical ports 1, 2, 3, 4 and 5 in the cell $C_{i,j}$ drawn in FIG. 2. The contents of these functional blocks and logical port s on component level is not described in the present application since a person skilled in the art of designing and manufacturing electronic components obviously can derive from the above given functional description how embodiments of each of these blocks and ports can be realized. For evident reasons, the designers can choose the kind of logic (positive or negative) and technology (bipolar, MOSFET, . . . ) depending on the application of the interfacing device INT or the integration thereof with other devices.

Also a remark is that the logical cell $c_{i,j}$ to constitute the matrix in the control unit CTRL, is defined by the relations between the output signals, CS and ENJ+1, and the input signals, DISI, CB and ENJ rather than by the structure of logical ports which realise these relations. A person skilled in the art of designing digital logic cells well-knows that the relations, defined by the state diagrams in FIG. 3 and FIG. 4, can be realized in many alternative ways by combining AND, OR, NAND, NOR and NOT ports. Since it is routine work for this person to design another logical cell $C_{i,j}$ realising the same relations between input signals and output signals, the scope of the present invention is not limited to any particular design of the contents of the cell $C_{i,j}$.

Yet another remark is that, although the above described embodiment of the interfacing device INT receives ATM cell headers on its input and is adapted to select 4 nibbles out of 8 incoming nibbles, the present invention is not limited to any particular value of N or M, or to any particular length of the incoming sets of bits (which is 4 bits for a nibble). Minor modifications of the above described embodiment of the interfacing device INT, enable it to be used for any other application wherein an incoming N-wide data stream has to be reduced to an outgoing M-wide data stream and wherein, eventually, a particular order in the incoming data stream has to be maintained in the outgoing data stream.

Furthermore, it should be noticed that it is not an absolute requirement of the present invention to apply incoming sets 1 to N−M+1 to the input terminals of MUX1, incoming sets 2 to N−M+2 to the input terminals of MUX2 and so on. When doing so, as already explained above, a matrix of logical cells having the functionality of the cell $C_{i,j}$ drawn in FIG. 2 guaranties that the order of incoming sets of bits is respected by the outgoing sets of bits. It is however obvious that in an alternative embodiment of the interfacing device INT according to the present invention wherein the order of incoming sets of bits is reversed in the outgoing sets of bits, incoming sets 1 to N−M+1 have to be applied to the inputs of MUXM, incoming sets 2 to N−M+2 have to be applied to the inputs of MUXM−1, and so on. Evidently, any other particular order in the outgoing sets of bits can be realized by selecting the distinct N−M+1 incoming sets of bits that are applied to MUX1, MUX2, ..., MUXM respectively in an appropriate way and by interconnecting the logical cells constituting the matrix in CTRL also in an appropriate way.

A further remark is that the selector SEL autonomously may know which sets of bits have to be extracted out of the N incoming sets of bits since it is hardcoded in a memory thereof, or may be informed about this via a control channel CC as was the case for the above described embodiment.

It is also clear for a person skilled in the art that an outgoing register OR, such as the one defined above, may optionally form part of the interfacing device INT according to the present invention, but may be omitted for instance when OR-wiring the outputs of the multiplexers MUX1, MUX2, ..., MUXM and controlling the multiplexers so that they do not source sets of bits simultaneously.

While the principles of the invention have been described above in connection with specific apparatus, it is to be clearly understood that this description is made only by way of example and not as a limitation on the scope of the invention.

What is claimed is:

1. Interfacing device (INT) to be coupled between an incoming channel (IC) and an outgoing channel (OC) and to be used to extract M outgoing sets of bits (OS1, OS2, ..., OSM) out of N incoming sets of bits (IS1, IS2, ..., ISN) received on said incoming channel (IC), M being an integer number smaller than N, said interfacing device (INT) comprising:

a. incoming register means (IR) provided to temporarily store said N incoming sets of bits (IS1, IS2, ..., ISN); and
   b. selection means (SEL) coupled between said incoming register means (IR) and said outgoing channel (OC), and provided to select M incoming sets of bits out of said N incoming sets of bits (IS1, IS2, ..., ISN) and to route said M incoming sets of bits to said outgoing channel (OC) to thereby produce said M outgoing sets of bits (OS1, OS2, ..., OSM),
   characterised in that said selection means (SEL) further comprises:
   c. a multiplexing unit (MUX) including M multiplexers (MUX1, MUX2, ..., MUXM), each multiplexer having a control input, N−M+1 input terminals adapted to sink N−M+1 incoming sets of bits out of said N incoming sets of bits (IS1, IS2, ..., ISN), and one output terminal adapted to source one of said N−M+1 incoming sets of bits under control of a control signal applied to said control input; and
   d. a control unit (CTRL) adapted to generate for said each multiplexer, said control signal and to apply said control signal via an output terminal of said control unit (CTRL) to said control input of said each multiplexer.

2. Interfacing device (INT) according to claim 1, characterised in that for a multiplexer with index i amongst said M multiplexers (MUX1, MUX2, ..., MUXM), said N−M+1 input terminals are adapted to respectively sink incoming sets of bits with indices i to i+N−M amongst said N incoming sets of bits (IS1, IS2, ..., ISN), and said output terminal of said multiplexer with index i is adopted to source an outgoing set of bits with index i amongst said M outgoing sets of bits (OS1, OS2, ..., OSM).

3. Interfacing device (INT) according to claim 1, characterised in that said control unit (CTRL) comprises:
   a matrix of identical logical cells ($C_{1,1}$; ...; $C_{M,N-M+1}$), each logical cell being associated with one multiplexer of said M multiplexers (MUX1, MUX2, ..., MUXM) and with one input terminal of said N−M+1 input terminals of said one multiplexer, and being adapted to generate a control signal indicating whether said output terminal of said one multiplexer has to source an incoming set of bits sunk by said one input terminal or not.

4. Interfacing device (INT) according to claim 3, characterised in that said each logical cell is equipped with three input terminals (CB, ENJ, DISI) and two output terminals (CS, ENJ+1) whereof:
   a first input terminal (CB) is adapted to sink a signal indicating whether said incoming set of bits forms part of said M incoming sets of bits to be selected by said selection means (SEL);
   a second input terminal (ENJ) is adapted to sink a signal indicating that said output terminal of said one multiplexer has to source an incoming set of bits sunk by another input terminal than said one input terminal;
   a third input terminal (DISI) is adapted to sink a signal indicating that an outgoing terminal of another multiplexer than said one multiplexer has to source said incoming set of bits sunk by said one input terminal;
   a first output terminal (CS) is adapted to source said control signal; and
   a second output terminal (ENJ+1) is adapted to source a signal indicating that said output terminal does not source said incoming set of bits sunk by said one input terminal.

5. Logical cell ($C_{i,j}$) to be used in a control unit (CTRL) of an interfacing device (INT) which extracts M outgoing sets of bits (OS1, OS2, ..., OSM) out of N incoming sets of bits (IS1, IS2, ..., ISN), M being an integer number smaller than N, said logical cell ($C_{i,j}$) being adapted to generate a control signal for an associated multiplexer in said interfacing device (INT) with N−M+1 input terminals adapted to sink N−M+1 incoming sets of bits, said logical cell ($C_{i,j}$) being associated with one input terminal of said N−M+1 input terminals and said control signal indicating whether an output terminal of said associated multiplexer has to source an incoming set of bits sunk by said one input terminal or not, said logical cell ($C_{i,j}$) being equipped with three input terminals (CB, ENJ, DISI) and two output terminals (CS, ENJ+1) whereof:

a first input terminal (CB) is adapted to sink a signal indicating whether an incoming set of bits has to be extracted by said interfacing device (INT);

a second input terminal (ENJ) is adapted to sink a signal indicating that said output terminal of said associated multiplexer has to source an incoming set of bits sunk by another input terminal than said one input terminal;

a third input terminal (DISI) is adapted to sink a signal indicating that an outgoing terminal of another multiplexer in said interfacing device (INT) than said associated multiplexer has to source said incoming set of bits sunk by said one input terminal;

a first output terminal (CS) is adapted to source said control signal; and a second output terminal (ENJ+1) is adapted to source a signal indicating that said output terminal does not source said incoming set of bits sunk by said one input terminal.

6. A control unit (CTRL) used to generate a control signal for each multiplexer of M multiplexers (MUX1, MUX2, ..., MUXM) in an interfacing device (INT) which extracts M outgoing sets of bits (OS1, OS2, ..., OSM) out of N incoming sets of bits (IS1, IS2, ..., ISN), M being an integer number smaller than N, said each multiplexer having N−M+1 input terminals adapted to sink N−M+1 incoming sets of bits, said control unit (CTRL) comprising a matrix of logical cells ($C_{1,1}$; ...; $C_{M,N-M+1}$), each logical cell ($C_{i,j}$) being associated with one multiplexer of said M multiplexers (MUX1, MUX2, ..., MUXM) and with one input terminal of said N−M+1 input terminals of said one multiplexer, and adapted to generate a control signal indicating whether an output terminal of said one multiplexer has to source an incoming set of bits sunk by said one input terminal or not, said each logical cell ($C_{i,j}$) being equipped with three input terminals (CB, ENJ, DISI) and two output terminals (CS, ENJ+1) whereof:

a first input terminal (CB) is adopted to sink a signal indicating whether said incoming set of bits has to be extracted by said interfacing device (INT);

a second input terminal (ENJ) is adopted to sink a signal indicating that said output terminal of said one multiplexer has to source an incoming set of bits sunk by another input terminal than said one input terminal;

a third input terminal (DISI) is adapted to sink a signal indicating that an outgoing terminal of another multiplexer in said interfacing device (INT) than said one multiplexer has to source said incoming set of bits sunk by said one input terminal;

a first output terminal (CS) is adapted to source said control signal; and a second output terminal (ENJ+1) is adapted to source a signal indicating that said output terminal does not source said incoming set of bits sunk by said one input terminal.

* * * * *

UNITED STATES PATENT AND TRADEMARK OFFICE
CERTIFICATE OF CORRECTION

PATENT NO. : 6,169,736 B1
DATED : January 2, 2001
INVENTOR(S) : Stefaan Margriet Albert Van Hoogenbemt It is certified that error appears in the above-identified patent and that said Letters Patent is hereby corrected as shown below:

Column 10,
Line 17, delete " adopted" and substitute -- adapted --.

Column 12,
Line 9, delete "adopted" and substitute -- adapted --.
Line 12, delete "adopted" and substitute -- adapted --.

Signed and Sealed this

Sixteenth Day of October, 2001

Attest:

NICHOLAS P. GODICI
*Attesting Officer*    *Acting Director of the United States Patent and Trademark Office*